United States Patent
Guo

(10) Patent No.: US 11,899,926 B2
(45) Date of Patent: Feb. 13, 2024

(54) METHOD AND APPARATUS FOR GENERATING COMBINED INSTRUCTION DURING APPLICATION OPERATION, AND STORAGE MEDIUM

(71) Applicant: BEIJING XIAOMI MOBILE SOFTWARE CO., LTD., Beijing (CN)

(72) Inventor: Chumou Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 109 days.

(21) Appl. No.: 17/486,290

(22) Filed: Sep. 27, 2021

(65) Prior Publication Data
US 2022/0308745 A1 Sep. 29, 2022

(30) Foreign Application Priority Data
Mar. 26, 2021 (CN) .......................... 202110328624.6

(51) Int. Cl.
*G06F 3/04883* (2022.01)
*G06F 9/451* (2018.01)
*G06F 3/041* (2006.01)

(52) U.S. Cl.
CPC ........ *G06F 3/04883* (2013.01); *G06F 3/0416* (2013.01); *G06F 9/451* (2018.02)

(58) Field of Classification Search
CPC ................. G06F 3/0416; G06F 3/0488; G06F 3/04883; G06F 9/451
See application file for complete search history.

(56) References Cited

U.S. PATENT DOCUMENTS 10,051,103 B1 * 8/2018 Gordon ................ G06F 3/0482
2018/0095772 A1 4/2018 Wu

FOREIGN PATENT DOCUMENTS

CN 111143200 A 5/2020

OTHER PUBLICATIONS

European Patent Application No. 21199520.4, Search and Opinion dated Mar. 17, 2022, 9 pages.

* cited by examiner

*Primary Examiner* — Yaron Cohen
(74) *Attorney, Agent, or Firm* — COZEN O'CONNOR

(57) ABSTRACT

Disclosed are a method and an apparatus for generating a combined instruction during an application operation. The method includes: generating an instruction recording layer corresponding to a target application, the instruction recording layer covering a target interface corresponding to the target application; receiving trigger operations for the target interface via the instruction recording layer, and generating a combined instruction corresponding to the target interface according to a trigger sequence and trigger locations of the trigger operations; and issuing the trigger operations to the target application, to cause the target application to execute operations corresponding to the trigger operations.

17 Claims, 3 Drawing Sheets

METHOD AND APPARATUS FOR GENERATING COMBINED INSTRUCTION DURING APPLICATION OPERATION, AND STORAGE MEDIUM

CROSS-REFERENCE TO RELATED APPLICATION

The present application is based upon and claims priority to Chinese Patent Application No. 202110328624.6, filed on Mar. 26, 2021, the entire contents of which are incorporated herein by reference.

FIELD

The present disclosure relates to a field of touch control technology, and more particularly, to a method and an apparatus for generating a combined instruction during an application operation, and a storage medium.

BACKGROUND

In order to facilitate user operations, most major manufacturers provide the function of generating combined instructions in electronic devices. This function can record the user's operation process by generating a combined instruction when the user is operating on any interface, so that the user can complete the series of operations included in the operation process by means of a one-key trigger when the user need to repeat the operation process.

SUMMARY

According to embodiments of the present disclosure, a method for generating a combined instruction during an application operation is provided. The method includes: generating an instruction recording layer corresponding to a target application, the instruction recording layer covering a target interface corresponding to the target application; receiving trigger operations for the target interface via the instruction recording layer, and generating a combined instruction corresponding to the target interface according to a trigger sequence and trigger locations of the trigger operations; and issuing the trigger operations to the target application, to cause the target application to execute operations corresponding to the trigger operations.

According to embodiments of the present disclosure, an apparatus for generating a combined instruction during an application operation is provided. The apparatus includes: one or more processors; a memory storing instructions executable by the one or more processors; in which the one or more processors are configured to: generate an instruction recording layer corresponding to a target application, the instruction recording layer covering a target interface corresponding to the target application; receive trigger operations for the target interface via the instruction recording layer, and generate a combined instruction corresponding to the target interface according to a trigger sequence and trigger locations of the trigger operations; and issue the trigger operations to the target application, to cause the target application to execute operations corresponding to the trigger operations.

Embodiments of the present disclosure also provide a non-transitory computer-readable storage medium having computer instructions stored thereon, in which when the instructions are executed by a processor, the processor is caused to implement a method for generating a combined instruction during an application operation is provided. The method includes: generating an instruction recording layer corresponding to a target application, the instruction recording layer covering a target interface corresponding to the target application; receiving trigger operations for the target interface via the instruction recording layer, and generating a combined instruction corresponding to the target interface according to a trigger sequence and trigger locations of the trigger operations; and issuing the trigger operations to the target application, to cause the target application to execute operations corresponding to the trigger operations.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
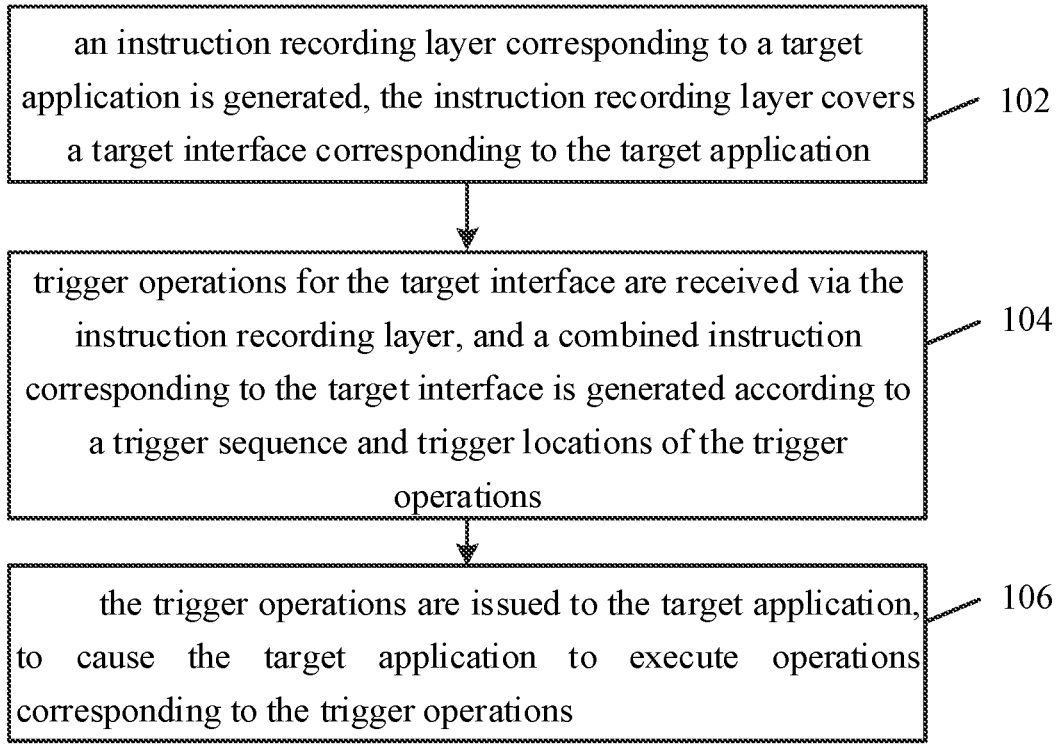
FIG. 1 is a flowchart of a method for generating a combined instruction in an application operation process according to an exemplary embodiment of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It is to be understood that, although terms of "first", "second" and "third" are used for description of various information in the present disclosure, the information are not limited to these terms. These terms are only used for distinguishing information with the same type. For example, without departing from the scope of the present disclosure, the first information may also be referred to as the second information; similarly, the second information may also be referred to as the first information. Depending on the context, such as the words in the use of "if" can be interpreted as "when . . . " or "when . . . " or "response to define".

Accessibility services first appeared in order to make it easier for people with disabilities to use electronic devices. After the accessibility services are enabled on the electronic device, the applications installed on the electronic device can obtain a large number of permissions, so as to help people with disabilities use the electronic device through the acquired permissions. For example, the application can obtain the permission to detect the user's triggering operation and the permission to broadcast voice, so as to help the blind person to broadcast the type, function and the like of any operation control when the operation control is triggered.

As user needs continue to increase, in addition to the above-mentioned functions, barrier-free services are slowly being applied to other fields. For example, in order to make operations more convenient for ordinary users, a method of generating combined instructions through accessibility services is proposed in related arts.

In actual operation, when the accessibility services are enabled, the services will broadcast the detected trigger operation (or a touch event) to each application. At this time, the application responsible for generating the combined instruction can record the user's multiple trigger operations on the interface corresponding to any other application, so as to generate the combined instruction corresponding to the any application. Then, the user can complete the multiple trigger operations only by initiating an execution instruction for the generated combined instruction at the next time when the user needs to perform the operations on any application again, which simplifies the user's operation.

It is not difficult to understand that, in the above process of generating the combined instruction, the reason why the accessibility service needs to be enabled is to allow the application responsible for generating the combined instruction to obtain the multiple trigger operations of the user for any application. However, in the related arts, the function of generating combined instructions can only be realized under the premise of enabling accessibility services. The accessibility services need to open a large number of permissions to all applications, that is, after the accessibility service was enabled, other permissions other than broadcast instructions were also opened to various applications, which is extremely prone to privacy leaks.

In order to avoid the leakage of user privacy, the present disclosure provides a method for generating combined instructions during application operation, so as to generate combined instructions for any application without enabling the accessibility services.

With the technical solution of the present disclosure, when it is determined that the user needs to generate a combined instruction for the target application, an instruction recording layer may be generated and covered on the target interface corresponding to the target application. The instruction recording layer is configured to receive multiple trigger operations of the user for the target application. On the one hand, these multiple trigger operations are recorded to generate corresponding combined instructions; on the other hand, triggering information of the multiple trigger operations may be issued to the target application so that the target application can perform corresponding operations according to the trigger operation of the user. It can be seen that, by generating the instruction recording layer, the present disclosure can generate combined instructions for the target application under the premise of ensuring that the user's trigger operations are normally responded to by the target application.

FIG. 1 is a flowchart of a method for generating a combined instruction in an application operation process according to an exemplary embodiment of the present disclosure. As shown in FIG. 1, the method may include the followings.

At 102, an instruction recording layer corresponding to a target application is generated, the instruction recording layer covers a target interface corresponding to the target application.

In the present disclosure, the application that needs to generate the combined instruction is called the target application, and the interface corresponding to the target application is called the target interface. It can be seen from the above content that the accessibility services need to be activated to broadcast the user's trigger operation for the target interface to the application responsible for generating the combined instruction in the related arts when the combined instruction needs to be generated for the target application. Since the accessibility service opens a large number of permissions to various applications, it is very easy to cause leakage of user's privacy.

In view of this, the present disclosure proposes a method for generating combined instructions without opening the accessibility service. Before introducing the solution, the technical basis of the solution is first introduced.

In the touch control field, at the hardware level, touch operations in electronic devices are detected through the touch screen and reported to the operating system; at the software level, all trigger operations are detected by the software layer. The layer is also called View. In actual applications, the trigger operation detected by any View is only allowed to be actively acquired and used by one application (it can also be regarded as being consumed by the application, this mechanism will be called as the consumption mechanism of the trigger operation in the present disclosure). For example, the above target interface can be regarded as a View. When a trigger operation is detected in the target interface, the trigger operation can no longer be acquired and used by other applications when the target operation is acquired by the target application for executing the corresponding operations.

Under this mechanism, as the detected trigger operation are broadcasted from the accessibility service to the respective applications in the related arts, the trigger operation is passively received for the respective applications, which is not regarded as a consumption of the trigger operation. Therefore, the mechanism is not violated. In the present disclosure, in order to generate the combined instruction without opening the accessibility service, a View dedicated to generating the combined instruction is additionally generated, which is referred to as the instruction recording layer in the present disclosure.

In the present disclosure, after the instruction recording layer is generated, it can be overlaid on the target interface, so as to receive the user's trigger operation on the target interface. At the software level, the trigger operation cannot penetrate the View. Therefore, when the user triggers on the touch screen, only the instruction recording layer covering the target interface can receive the trigger operation. In order to enable the target application to detect the trigger operation and perform the corresponding operation, after the instruction recording layer in the present disclosure receives the trigger operation and sends the trigger information of the trigger operation to the operating system, on the one hand, the trigger information is recorded for generating the combined instruction; on the other hand, the trigger information of the trigger operation is issued to the target application again to cause the target application to determine the trigger location corresponding to the trigger operation on the target interface and to execute the operation instruction corresponding to the trigger location (or to respond to the trigger operation). This process can be understood as that, the user triggers on the View of target interface again. In other words, with the method, the user respectively triggers on two Views—instruction recording layer and the target interface. The trigger operation on the instruction recording layer is used to generate a combined instruction, and the trigger operation on the target interface is used to instruct the target application to perform the corresponding operation.

It can be seen that, through the technical solution of the present disclosure, when the user operates the target application program, the corresponding combined instruction can be generated according to the user's trigger operation. It will not violate the consumption mechanism in the touch field, and there is no need to enable the accessibility service, which avoids the privacy leakage caused by the need to enable the accessibility service in the related arts.

In the present disclosure, the user can convey an instruction to generate the combined instruction to the electronic device in a variety of ways.

In an embodiment, a combined instruction generation control may be preset in the target interface, and the user may trigger the combined instruction generation control to inform the electronic device that it is necessary to generate a combined instruction for the target application. Then, after detecting the trigger operation, the electronic device can generate an instruction recording layer corresponding to the target application for generating a combined instruction.

In another embodiment, a condition can be set so that the electronic device can determine by itself whether the user needs to generate a combined instruction. For example, the frequency at which the user triggers the touch screen can be used as the basis for judgment. Specifically, a preset value of a time interval can be preset, so as to determine whether the time interval among trigger operations of the user at multiple locations on the target interface is less than the preset value. If yes, it is determined that the user needs to generate a combined instruction, and then an instruction recording layer corresponding to the target application is generated for generating the combined instruction.

In another embodiment, the instruction for generating the combined instruction may be bound to any gesture instruction, so that the electronic device generates an instruction recording layer corresponding to the target application when the any gesture instruction is detected. In the present disclosure, any gesture instruction may be referred to as a preset gesture instruction corresponding to the combined instruction generating operation. For example, the preset gesture instruction may be a sliding gesture, a flip gesture, a tilt gesture, etc., which can be specifically determined by a person skilled in the art according to actual needs, and the present disclosure does not limit this.

At 104, trigger operations for the target interface are received via the instruction recording layer, and a combined instruction corresponding to the target interface is generated according to a trigger sequence and trigger locations of the trigger operations.

In the present disclosure, a coordinate system can be established to record the user's trigger operation on the target interface. Specifically, when multiple trigger operations are detected by the instruction recording layer, the multiple trigger coordinates corresponding to the multiple trigger operations can be determined based on the above coordinate system; and the multiple trigger coordinates are recorded according to the trigger sequence of the multiple trigger operations and determined as the combined instruction corresponding to the target application.

It should be understood that after the combined instruction is generated, when multiple trigger operations consistent with the combined instruction need to be repeatedly executed, it can be completed by triggering the combined instruction. In actual operation, the combined instruction can be triggered in a variety of ways. For example, the combined instruction can be bound to any gesture instruction so that the user can trigger the combined instruction through a corresponding gesture. For example, it can also be executed by generating a corresponding combined instruction in the target interface to execute the control. The user can trigger the combined instruction through the combined instruction execution control. How to trigger the generated combined instruction can be determined by those skilled in the art as needed.

In actual applications, actual operating instructions usually need to be executed by the corresponding application. Therefore, in the present disclosure, when an execution instruction for the generated combined instruction is received, the combined instruction can be issued to the corresponding target application, so that the target application can trigger at the corresponding locations on the target interface according to the trigger locations and the trigger sequence contained in the combined instruction. It needs to be declared that the trigger locations of multiple trigger operations and the trigger sequence among the multiple trigger locations are recorded in the combined instruction. Therefore, after the target application receives the combined instruction, each trigger location recorded in the combined instruction may be triggered in sequence according to the trigger sequence recorded in the combined instruction to ensure that the multiple trigger operations performed by the user for the first time can be completely executed again.

At 106, the trigger operations are issued to the target application, to cause the target application to execute operations corresponding to the trigger operations.

It should be emphasized that in the present disclosure, a combined instruction is generated based on multiple trigger operations of the user during the user operates on the target interface. Therefore, as mentioned above, in addition to recording the trigger locations and the trigger sequence of multiple trigger operations, it is also necessary to deliver trigger information of the trigger operation to the target application to ensure that the target application can perform the corresponding operation. Specifically, after the above-mentioned multiple trigger operations are issued to the target application, the target application can determine, from the target interface, the locations corresponding to the trigger location of each trigger operation, and execute operations corresponding to the multiple positions. Of course, in actual operation, in order to ensure that the target application can respond to these multiple trigger operations timely, after receiving any trigger operation, the instruction recording layer uploads the same to the operating system, and after the operating system receives the trigger operation, on the one hand, the trigger information of any trigger operation (mainly the trigger location) will be recorded, or sent to the third-party application responsible for generating the combined instruction for recording; on the other hand, the operating system will also issue the trigger information to the target application, so that the target application determines the location that the user wants to trigger on the target interface according to the trigger information, and then executes the corresponding instruction according to the determined locations. Further, after the operating system or a third-party application records all the trigger information of the multiple trigger operations, a combined instruction corresponding to the multiple trigger operations can be generated.

In the present disclosure, the instruction recording layer may be generated by the operating system of the electronic device, in other words, the instruction recording layer is a system-level instruction recording layer; or, the instruction recording layer may be generated by a third-party application that is different from the target application, that is, the third-party application responsible for generating the instruction record layer. It should be understood that, for both the instruction recording layers generated by the operating system and the third-party application, the combined instructions can be generated while the user is operating on the target interface, which will not affect the target application to the user. The normal response of the operation can generate combined instructions for continuous operations which needs to be repeatedly operated.

In the present disclosure, in order to make the respective locations on the instruction recording layer to correspond to respective locations on the target interface, it is more convenient to determine that the user is targeting on the target interface according to the trigger operation received on the instruction recording layer. At any location, the size of the command recording layer can be designed to be consistent with the target interface.

Correspondingly, in order not to hinder the user's triggering operation on the target interface, the generated instruction recording layer may be a transparent layer, so that the user can intuitively see various operation controls on the target interface through the instruction recording layer. In other words, designing the instruction recording layer as a transparent layer enables the user to operate on the target interface and generate corresponding combined instructions without feeling the instruction recording layer.

It needs to be stated that the technical solution of the present disclosure can be applied to any type of electronic device. For example, the electronic device can be a mobile terminal such as a smart phone or a tablet computer, or a fixed terminal such as a smart TV or a PC (Personal Computer) and the like. It should be understood that as long as the electronic device controlled by the user's touch operation can be used as the electronic device to which the present disclosure is applied, the specific type of electronic device to which the present disclosure is applied can be determined by those skilled in the art as needed, which will not be limited herein.

It can be seen from the above technical solutions that the present disclosure can generate an instruction recording layer when it is determined that the user needs to generate a combined instruction for the target application, and overlay it on the target interface corresponding to the target application. On this basis, the user's multiple trigger operations for the target application may be received through the instruction recording layer. On the one hand, the corresponding combined instructions may be generated by recording these multiple trigger operations; on the other hand, the target application may perform corresponding operations according to the user's trigger operation by the target application issuing trigger information of multiple trigger operations. It can be seen that, by generating the instruction recording layer, the present disclosure can generate corresponding combined instructions while ensuring that the user's trigger operation is normally responded.

It should be understood that in the related arts, accessibility services are enabled so that other applications can passively receive user-triggered operations on the target application. Since the process is not regarded as the consumption of a trigger operation, the trigger operation can be recorded by other applications while being consumed by the target application. That is, the accessibility services are enabled to avoid the mechanism in the touch control field where the user's trigger on a software layer can only be consumed by one application. In this disclosure, an additional instruction recording layer is generated to receive a user's trigger operation on the target interface. On one hand, the trigger information of the trigger operation is recorded to generate a combined instruction, and on the other hand, the trigger information is issued to the target application, so that the corresponding locations of the target interface can be triggered. This method is equivalent to the user triggering on the instruction recording layer and the software layer corresponding to the target interface respectively. The triggers for the instruction recording layer are recorded to be used to generate combined instructions; and the triggers for the target interface are consumed by the target application to perform corresponding operations. In other words, the present disclosure creates an additional software layer to add a way that a trigger operation can be consumed. Under the premise of not violating the above consumption mechanism, it satisfies that the user will trigger the target application for the requirement of generating the combined instruction while operating the target application, which avoids the leakage of user privacy caused by enabling the accessibility services for generating the combined instruction in the related arts.

In addition, the present disclosure uses the generated instruction recording layer to record the user's multiple trigger operations on the target interface, and at the same time, trigger information of the trigger operation is sent to the target application, that is, the trigger is also performed on the software layer—the target interface. In the touch field, among the multiple software layers that cover each other, a trigger operation can only be received by the uppermost software layer, and this disclosure uses the above-mentioned method of re-issuing trigger information so that the covered software layer can also receive the trigger operation, it is equivalent to provide a penetration method for trigger operation.

The technical solution of the present disclosure will be introduced hereinafter by taking the user generating a combination instruction in the process of playing a mobile game as an example.

Figure 2:
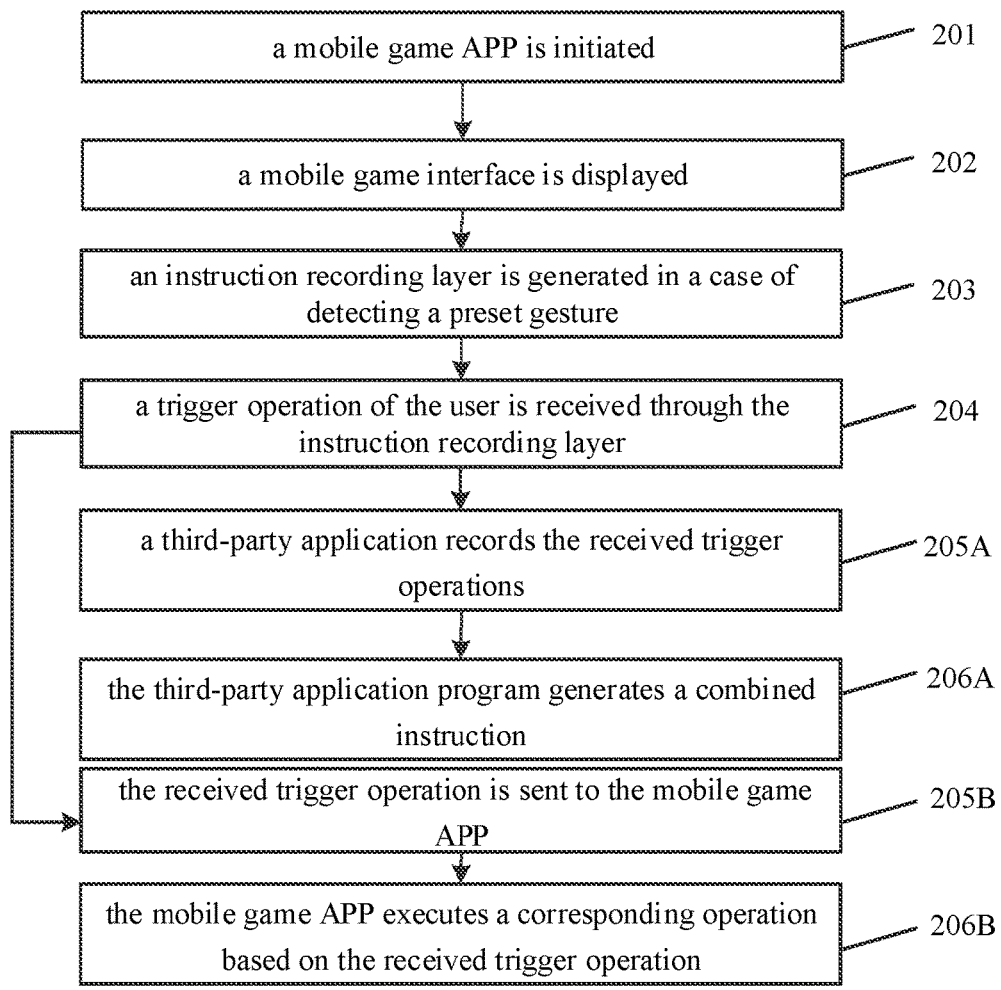
FIG. 2 is a flowchart of a method for generating a combined instruction in an application operation process according to another exemplary embodiment of the present disclosure.

FIG. 2 is a flowchart of a method for generating a combined instruction in an application operation process according to another exemplary embodiment of the present disclosure. As shown in FIG. 2, the method may include the followings.

At 201, a mobile game APP is initiated in a case of detecting a trigger operation on an icon of the mobile game APP by a user.

In this embodiment, the user can install the mobile game APP he/she often plays on the smart phone in advance. Then, when the user wants to play the mobile game, he/she can start the mobile game APP by triggering the icon of the mobile game APP.

At 202, a mobile game interface corresponding to the mobile game APP is displayed.

In this embodiment, after the mobile game APP is initiated, the operation interface corresponding to the mobile game APP can be displayed.

Taking the mobile game as a shooting mobile game M as an example, after the mobile game M is initiated, the preparation interface corresponding to the mobile game M can be displayed. After the preparation is over, the user can trigger the operation control to start the game to enter the game progress interface. The progress interface of a shooting game usually contains multiple operation controls such as a mobile control, a shooting control, and a taking aim control. At this time, in order to facilitate the operation, the user may need to generate a combined instruction. For example, in order to facilitate quick shooting, the user may combine the taking aim control and the shooting control into the combined instruction of "taking aim+shooting". In a shooting game, the game interface may turn into a sniper-scope effect by triggering the taking aim control when using a gun tool.

At 203, an instruction recording layer corresponding to the mobile game APP is generated in a case of detecting a preset gesture of the user.

In this embodiment, the function of generating a combined instruction can be bound to any gesture instruction in advance, so that when the user needs to generate a combined instruction, the function of "generating a combined instruction" can be enabled through the gesture instruction. For example, a flip gesture for the mobile phone can be bound with the function of generating the combined instruction in advance, so as to start the function of generating the combined instruction.

Following the above example, after the user enters the progress interface of the mobile game M, if the user wants to generate a combined instruction, he can activate the function of generating the combination instruction by revolving the phone. After the function is activated, the corresponding instruction recording layer can be generated to receive the user's trigger operation for the above-mentioned interface.

Figure 3:
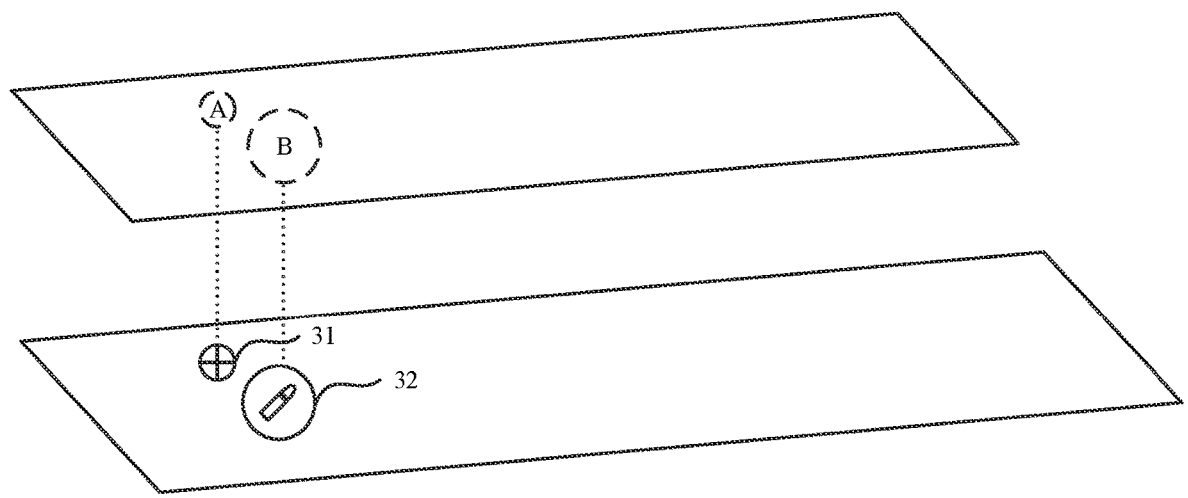
FIG. 3 is a schematic diagram of an instruction recording layer according to an exemplary embodiment of the present disclosure.

For example, the generated instruction recording layer may be as shown in FIG. 3, the lower layer is the interface corresponding to the mobile game M, and the upper layer is the generated instruction recording layer. In the progress interface, there are a taking aim control 31 and a shooting control 32. It should be noted that the actual progress interface may also include multiple other operation controls. Since this embodiment takes the generation of a combination command of "taking aim+shooting" as an example, only relevant controls are shown in the figure.

At 204, a trigger operation of the user is received through the instruction recording layer in a case of detecting the triggering operation of the user on the mobile game interface.

In this embodiment, the instruction recording layer is usually designed as a transparent layer, so that the user can directly see the operation controls om the interface of the mobile game through the instruction recording layer.

In actual operation, after the instruction recording layer receives the user's trigger operation, it will be processed by the operating system to realize different functions. In this embodiment, for example, the third-party application program N is responsible for generating the combined instruction. Therefore, the operating system sends the trigger operation received by the instruction recording layer to the third-party application program N to record and generate the corresponding instruction. On the other hand, the trigger operation may be issued to the APP of the mobile game M so that the corresponding operation may be performed.

At 205A, a third-party application records the received trigger operations.

At 206A, the third-party application program generates a combined instruction corresponding to the mobile game APP based on the recorded trigger operations.

The embodiment is equivalent to that a third-party application responsible for generating combined instructions is specifically pre-installed. It should be noted that, this embodiment only takes this situation as an example. In actual operation, the above-mentioned instruction recording layer can also be generated by the operating system at the system level for generating combined instructions. The specific method adopted is not limited in the present disclosure.

At 205B, the trigger operation received by the instruction recording layer is sent to the mobile game APP.

at 206B, the mobile game APP executes a corresponding operation based on the received trigger operation.

It should be noted that after the instruction recording layer receives any trigger operation, the operating system will not only send the trigger information of any trigger operation to the third-party application N, but also send any trigger operation to the mobile game APP in real time, to ensure the timely response and the normal operation of mobile games.

Continuing the above example, after the function of generating the combined instruction is activated, the user triggers the "taking aim" control in the above proceeding interface (in the user's view, the "taking aim" control is triggered, and the trigger operation is actually received by the generated instruction recording layer in a case that the user actually triggers the area A on the instruction recording layer), the operating system sends the trigger operation to the third-party application N for recording on the one hand, and sends the trigger operation to the mobile game M APP on the other hand, such that the user-triggered control is determined as the "taking aim" control according to the trigger location corresponding to the trigger operation, and then the screen in the taking aim scene is displayed in the progress interface. Subsequently, after the user further triggers the "shooting" control in the above interface (similarly, in the user's view, the "shooting" control is triggered, the trigger operation is actually received by the generated instruction recording layer in a case that the user actually triggers the area B on the instruction recording layer). On the one hand, the operating system sends the trigger operation to the third-party application N for recording, and sends the trigger operation to the APP of the mobile game M on the other hand, such that the user-triggered control is determined as the "shooting" control according to the trigger location corresponding to the trigger operation, and then the shooting special effects is displayed in the proceeding interface.

After completing the above actions, the user revolves the smartphone again. After the operating system detects the gesture instruction, the corresponding instructions may be sent to the third-party application N, so that the third-party application N can generates the combined instruction of "taking aim+shooting" according to the recorded trigger information related to the "taking aim" control and the trigger information related to the "shooting" control.

In practical applications, the execution control corresponding to the combined instruction of "taking aim+shooting" can be further generated in the above progress interface, so that the user can trigger the two instructions of "taking aim+shooting" with one key.

It can be seen from the above technical solutions that the present disclosure can generate combined instructions for applications installed on smart phones by generating an instruction recording layer, so as to simplify user operations. After the instruction recording layer receives the above trigger operation, the trigger information of the trigger operation is sent to the third-party application on the one hand, so that the combined instruction is generated according to the recorded trigger information, and on the other hand, the trigger operation may be sent to the target application, so that the target application responds accordingly. It can be seen that through the technical solution of the present disclosure, a combined instruction can be generated without activating the accessibility services, which avoids the problem of privacy leakage due to the need to activate the accessibility service in the related arts.

Figure 4:
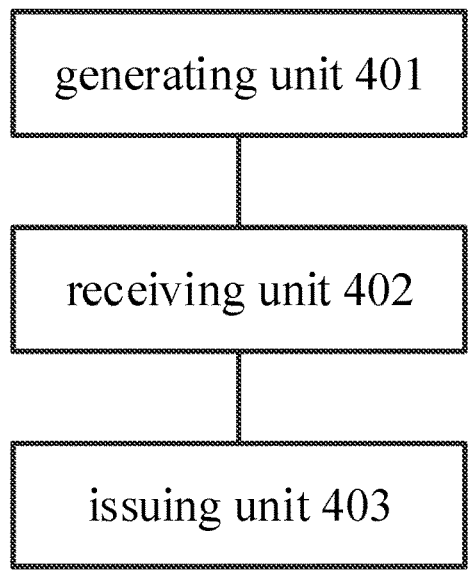
FIG. 4 is a block diagram of an apparatus for generating a combined instruction in an application operation process according to an exemplary embodiment of the present disclosure.

FIG. 4 is a block diagram of an apparatus for generating a combined instruction in an application operation process according to an exemplary embodiment of the present disclosure. referring to FIG. 4, the apparatus includes a generating unit 401, a receiving unit 402, and an issuing unit 403.

The generating unit 401 is configured to generate an instruction recording layer corresponding to a target application, the instruction recording layer covering a target interface corresponding to the target application.

The receiving unit 402 is configured to receive trigger operations for the target interface via the instruction recording layer, and generate a combined instruction corresponding to the target interface according to a trigger sequence and trigger locations of the trigger operations.

The issuing unit 403 is configured to issue the trigger operations to the target application, to cause the target application to execute operations corresponding to the trigger operations.

Optionally, the generating unit 401 is configured to: generate the instruction recording layer corresponding to the target application in a case of detecting that a combined instruction generation control on the target interface is triggered; or, generate the instruction recording layer corresponding to the target application in a case of detecting that a time interval at which locations on the target interface are triggered is less than a preset value; or, generate the instruction recording layer corresponding to the target application in a case of detecting a preset gesture instruction.

Optionally, the receiving unit 402 is configured to: determine trigger coordinates corresponding to the trigger operations based on a coordinate system corresponding to the target interface in a case of the instruction recording layer detecting the trigger operations; and record the trigger coordinates according to the trigger sequence of the trigger operations as the combined instruction corresponding to the target interface.

Optionally, the issuing unit 403 is configured to: issue the trigger operations to the target application, to cause the target application to determine a location on the target interface that corresponds to a trigger location of each trigger operation and to execute an operation corresponding to the location.

Optionally, the issuing unit 403 is configured to: issue the combine instruction to the target application in a case of receiving an execution instruction for the combined instruction, to cause the target application to trigger on corresponding locations on the target interface according to the trigger locations and the trigger sequence of the trigger operations.

Optionally, the instruction recording layer is a system-level instruction recording layer; or, the instruction recording layer is generated by a third-party application which is different from the target application.

Optionally, a size of the instruction recording layer is same as that of the target interface.

Optionally, the instruction recording layer is a transparent layer.

For the apparatus embodiment, since it basically corresponds to the method embodiment, the relevant part can refer to the part of the description of the method embodiment. The apparatus embodiments described above are merely illustrative, where the units described as separate components may or may not be physically separated, and the components displayed as units may or may not be physical units, that is, they may be located at one place, or it may be distributed to multiple network units. Some or all of the modules can be selected according to actual needs to achieve the objectives of the solutions of the present disclosure. Those of ordinary skilled in the art can understand and implement without creative work.

Correspondingly, the present disclosure also provides an apparatus for generating a combined instruction during an application operation, including: a processor; a memory for storing executable instructions of the processor; in which the processor is configured to implement the above-mentioned embodiment. For example, the method may include: generating an instruction recording layer corresponding to a target application, the instruction recording layer covering a target interface corresponding to the target application; receiving trigger operations for the target interface via the instruction recording layer, and generating a combined instruction corresponding to the target interface according to a trigger sequence and trigger locations of the trigger operations; and issuing the trigger operations to the target application, to cause the target application to execute operations corresponding to the trigger operations.

Correspondingly, the present disclosure also provides an electronic device that includes a memory and one or more programs, in which one or more applications are stored in the memory and configured to be executed by one or more processors, so as to implement instructions for implementing the method for generating a combined instruction during an application operation as described in any of the above embodiments. For example, the method may include: generating an instruction recording layer corresponding to a target application, the instruction recording layer covering a target interface corresponding to the target application; receiving trigger operations for the target interface via the instruction recording layer, and generating a combined instruction corresponding to the target interface according to a trigger sequence and trigger locations of the trigger operations; and issuing the trigger operations to the target application, to cause the target application to execute operations corresponding to the trigger operations.

Embodiments of the present disclosure also provide a non-transitory computer-readable storage medium having computer instructions stored thereon, in which when the instructions are executed by a processor, the processor is caused to implement a method for generating a combined instruction during an application operation as mentioned in above embodiments of the present disclosure.

Figure 5:
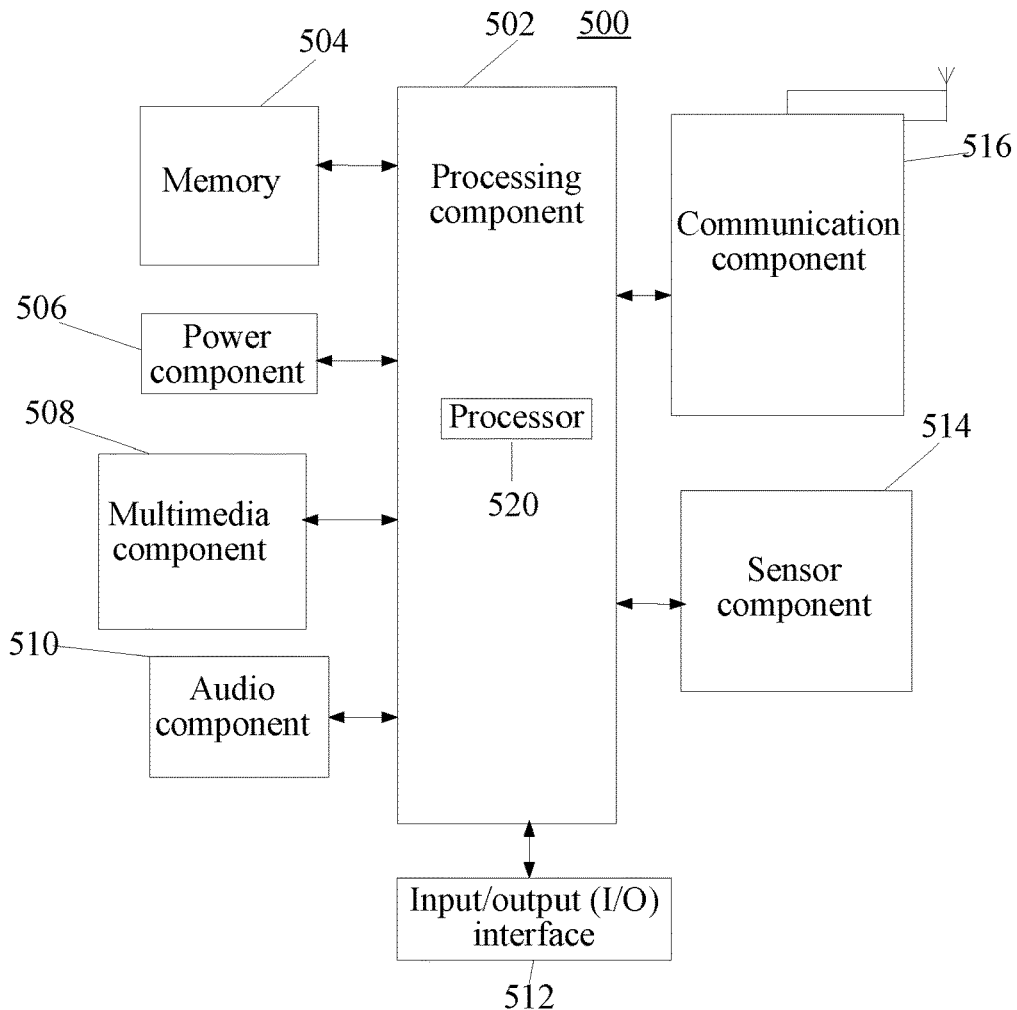
FIG. 5 is a schematic structural diagram of an electronic device in an exemplary embodiment of the present disclosure.

FIG. 5 is a schematic structural diagram of an apparatus 500 for generating a combined instruction in an application operation process in an exemplary embodiment of the present disclosure. For example, the apparatus 500 may be a mobile phone, a computer, a digital broadcasting terminal, a message sending and receiving equipment, a game controller, a tablet device, a medical device, a fitness equipment, a personal digital assistant or the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the apparatus 500, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The above descriptions are merely the preferred embodiments of the present disclosure, and are not intended to limit the present disclosure. Any modification, equivalent replacement, improvement, etc. made within the spirit and principle of the present disclosure shall be included in the protection range of the present disclosure.

What is claimed is:

1. A method for generating a combined instruction during an application operation, comprising:
   generating an instruction recording layer corresponding to a target application, the instruction recording layer covering a target interface corresponding to the target application;
   receiving trigger operations for the target interface via the instruction recording layer, and generating a combined instruction corresponding to the target interface according to a trigger sequence and trigger locations of the trigger operations; and
   issuing the trigger operations to the target application, to cause the target application to execute operations corresponding to the trigger operations,
   wherein receiving the trigger operations for the target interface via the instruction recording layer, and generating the combined instruction corresponding to the target interface according to the trigger sequence and trigger locations of the trigger operations comprises:
   determining trigger coordinates corresponding to the trigger operations based on a coordinate system corresponding to the target interface in a case of detecting the trigger operations by the instruction recording layer; and
   recording the trigger coordinates according to the trigger sequence of the trigger operations as the combined instruction corresponding to the target interface.

2. The method of claim 1, wherein generating the instruction recording layer corresponding to the target application comprises at least one of:
   generating the instruction recording layer corresponding to the target application in a case of detecting that a combined instruction generation control on the target interface is triggered; and
   generating the instruction recording layer corresponding to the target application in a case of detecting that a time interval at which locations on the target interface are triggered is less than a preset value; and
   generating the instruction recording layer corresponding to the target application in a case of detecting a preset gesture instruction.

3. The method of claim 1, wherein issuing the trigger operations to the target application, to cause the target application to execute operations corresponding to the trigger operations comprises:
   issuing the trigger operations to the target application, to cause the target application to determine a location on the target interface that corresponds to a trigger location of each trigger operation and to execute an operation corresponding to the location.

4. The method of claim 1, further comprising:
   issuing the combined instruction to the target application in a case of receiving an execution instruction for the combined instruction, to cause the target application to trigger on corresponding locations on the target interface according to the trigger locations and the trigger sequence of the trigger operations.

5. The method of claim 1, wherein:
   the instruction recording layer is at least one of a system-level instruction recording layer and a layer generated by a third-party application which is different from the target application.

6. The method of claim 1, wherein a size of the instruction recording layer is same as that of the target interface.

7. The method of claim 1, wherein the instruction recording layer is a transparent layer.

8. An apparatus for generating a combined instruction during an application operation, comprising:
   one or more processors;
   a memory storing instructions executable by the one or more processors;
   wherein the one or more processors are configured to:
   generate an instruction recording layer corresponding to a target application, the instruction recording layer covering a target interface corresponding to the target application;
   receive trigger operations for the target interface via the instruction recording layer, and generate a combined instruction corresponding to the target interface according to a trigger sequence and trigger locations of the trigger operations; and
   issue the trigger operations to the target application, to cause the target application to execute operations corresponding to the trigger operations,
   wherein the one or more processors are configured to:
   determine trigger coordinates corresponding to the trigger operations based on a coordinate system corresponding to the target interface in a case of the instructions recording layer detecting the trigger operations; and
   record the trigger coordinates according to the trigger sequence of the trigger operations as the combined instruction corresponding to the target interface.

9. The apparatus of claim 8, wherein the one or more processors are configured to perform at least one act of:
   generating the instruction recording layer corresponding to the target application in a case of detecting that a combined instruction generation control on the target interface is triggered; and
   generating the instruction recording layer corresponding to the target application in a case of detecting that a time interval at which locations on the target interface are triggered is less than a preset value; and
   generating the instruction recording layer corresponding to the target application in a case of detecting a preset gesture instruction.

10. The apparatus of claim 8, wherein the one or more processors are configured to:
    issue the trigger operations to the target application, to cause the target application to determine a location on the target interface that corresponds to a trigger location of each trigger operation and to execute an operation corresponding to the location.

11. The apparatus of claim 8, wherein the one or more processors are configured to:
    issue the combined instruction to the target application in a case of receiving an execution instruction for the combined instruction, to cause the target application to trigger on corresponding locations on the target interface according to the trigger locations and the trigger sequence of the trigger operations.

12. The apparatus of claim 8, wherein,
the instruction recording layer is at least one of a system-level instruction recording layer and a layer generated by a third-party application which is different from the target application.

13. The apparatus of claim 8, wherein a size of the instruction recording layer is same as that of the target interface.

14. The apparatus of claim 8, wherein the instruction recording layer is a transparent layer.

15. A non-transitory computer-readable storage medium having computer instructions stored thereon, wherein when the instructions are executed by a processor, the processor is caused to implement a method for generating a combined instruction during an application operation, and the method comprises:
generating an instruction recording layer corresponding to a target application, the instruction recording layer covering a target interface corresponding to the target application;
receiving trigger operations for the target interface via the instruction recording layer, and generating a combined instruction corresponding to the target interface according to a trigger sequence and trigger locations of the trigger operations; and
issuing the trigger operations to the target application, to cause the target application to execute operations corresponding to the trigger operations,
wherein receiving the trigger operations for the target interface via the instruction recording layer, and generating the combined instruction corresponding to the target interface according to the trigger sequence and trigger locations of the trigger operations comprise:
determining trigger coordinates corresponding to the trigger operations based on a coordinate system corresponding to the target interface in a case of the instruction recording layer detecting the trigger operations; and
recording the trigger coordinates according to the trigger sequence of the trigger operations as the combined instruction corresponding to the target interface.

16. The storage medium of claim 15, wherein generating the instruction recording layer corresponding to the target application comprises at least one of:
generating the instruction recording layer corresponding to the target application in a case of detecting that a combined instruction generation control on the target interface is triggered; and
generating the instruction recording layer corresponding to the target application in a case of detecting that a time interval at which locations on the target interface are triggered is less than a preset value; and
generating the instruction recording layer corresponding to the target application in a case of detecting a preset gesture instruction.

17. The storage medium of claim 15, wherein issuing the trigger operations to the target application, to cause the target application to execute operations corresponding to the trigger operations comprises:
issuing the trigger operations to the target application, to cause the target application to determine a location on the target interface that corresponds to a trigger location of each trigger operation and to execute an operation corresponding to the location.

* * * * *